June 27, 1967 R. C. TRESEDER ET AL 3,328,523

SCANNING APPARATUS

Filed July 24, 1964 2 Sheets-Sheet 1

INVENTORS.
ROBERT C. TRESEDER
KARL A. BELSER
BY
John H. Holcombe
ATTORNEY 3,328,523

SCANNING APPARATUS

Robert C. Treseder, San Jose, and Karl A. Belser, Palo Alto, Calif., assignors to International Business Machines Corporation, New York, N.Y., a corporation of New York Filed July 24, 1964, Ser. No. 384,948
6 Claims. (Cl. 178—6.8)

ABSTRACT OF THE DISCLOSURE

The invention provides alternating scans of a surface by mutually perpendicular lines of light for detecting a selected point on the surface. A beam splitting mirror splits a planar beam of light from a light source into two parts. One part of the beam is reflected by a mirror to produce a vertical beam of light which is swept from left to right across the surface. The other portion of the beam of light from the source is reflected by a mirror to form a horizontal line of light which is swept from bottom to top of the surface. The mirrors are geared to sweep lines of light alternately across the surface in synchronism with a clock source. The output of the clock is provided to a counter. A light-sensitive pointer is provided which is aimed at a selected point on the surface. Upon detecting either of the lines of light, the output of the light-sensitive device is used to gate the instantaneous count of the counter, thereby providing the rectangular coordinates of the selected point.

The present invention relates to scanning apparatus and, more particularly, to apparatus for providing alternating scan of a surface by mutually perpendicular lines of light for detecting a selected point on the surface.

A number of types of techniques for scanning a surface have been suggested by the prior art. A prominent technique is to utilize a fluorescent lamp, reflector and mirror to direct a narrow beam of light onto the surface to be scanned so that the light reflected from the surface is sensed by a bank of photocells. The lamp and photoconductors are then moved relative to the surface so that the line of light is scanned across the surface. However, the resolution of the system is limited by the size and accuracy of the photocells and by the necessary distance of the photocells from the surface being scanned. It has also been proposed in the art to employ an optical flying spot scanner to scan the surface in a raster pattern similar to that of a television CRT. The difficulty with such a system is that the selected spot may be detected by two scans, or, perhaps, the selected point may fall between scanning lines and not be detected at all. Cathode ray tube scanning light beams have also been employed for similar purposes, but these devices are subject to the same practical difficulties as the optical raster scan.

Thus, it is an object of the present invention to provide improved apparatus for scanning a surface to detect a point thereon.

Another object of the present invention is to provide apparatus for scanning a surface and allowing manual selection of a point on the surface, which point is detected by the scanning apparatus.

Still another object of the present invention is to provide a scanning apparatus for scanning a surface to detect a selected point thereon, which avoids errors generally associated with raster scanning or photocell array linear scanning devices.

Thus, in accordance with our invention, scanning apparatus is provided for producing a first line of light and a second line of light perpendicular to the first line of light, and means are provided for alternately scanning the mutually perpendicular lines of light across the surface to be scanned. Additionally, a hand-held pointer, having a light-responsive sensing means thereon, is manually positioned at any selected point on the surface and provides an output pulse when thereafter illuminated by either of the perpendicular lines of light.

A feature of the present invention is that it is a convenient source for providing rectangular coordinates of the location of the selected point on the scanned surface.

The foregoing and other objects, features and advantages of the invention will be apparent from the following more particular description of preferred embodiments of the invention, as illustrated in the accompanying drawings in which.

Briefly, in accordance with the first preferred embodiment of the invention, novel apparatus is provided for causing mutually perpendicular lines of light to be alternately swept across the surface to be scanned in synchronism with a counter. Additionally, a light-sensitive pointer is provided which is aimed at a selected point on the surface. Upon detecting either of the lines of light, the output of the light-sensitive device is used to gate the instantaneous count of the counter, thereby providing the rectangular coordinates of the selected point.

Figure 1:
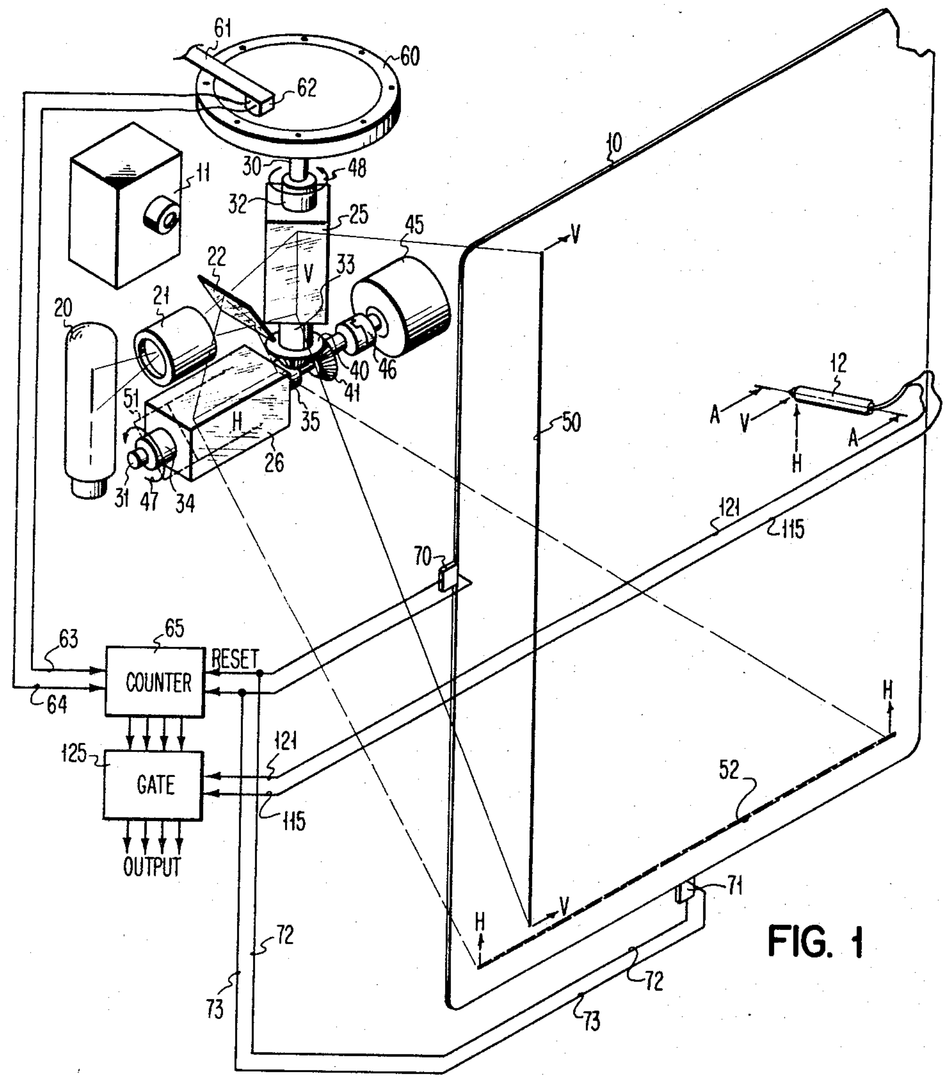
FIG. 1 is a perspective view, combined with a block electrical circuit diagram, illustrating the invention in preferred form.

Referring to FIG. 1, there is shown a surface 10 to be scanned. In the embodiment shown, surface 10 is a transparent glass sheet which is illuminated with images by projector 11, which may be a film, slide, microfilm, radar, etc. projector. The operator responds to the image thus projected by pressing a pointer 12 against the screen 10 at a point thereon selected by the operator. The screen is then scanned to detect the selected point.

The scanning apparatus includes a lamp 20 of the line filament or fluorescent type producing a line of light. A focusing lens 21 is situated adjacent lamp 20 and directs the line of light from lamp 20 to a beam splitter 22. Beam splitter 22 is a sheet of glass having a mirrorized reflective surface. The reflective surface is arranged to reflect one-half of the light impinging thereon and to allow the remaining one-half of the light to penetrate the reflective surface.

Two mirrors 25 and 26 are provided, each having four identical reflective surfaces at right angles to one another so that the end view of the surfaces is a square. Mirror 25 is mounted on shaft 30 such that its four reflective surfaces are each equidistant from and parallel to the axis of shaft 30. Mirror 26 is similarly mounted on shaft 31. Shaft 30 is mounted for rotation about its axis by bearings 32 and 33. These bearings are attached to a structural frame (not shown) so as to hold the axis of shaft 30 in vertical alignment and to prevent mirror 25 from moving up or down. Shaft 31 is similarly mounted for rotation in bearings 34 and 35. Bearings 34 and 35 are attached to the frame so as to maintain the axis of shaft 31 perpendicular to the axis of shaft 30 and to prevent mirror 26 from moving to either side.

A gear 40 is fixedly mounted at the bottom end of shaft 30. Similar gear 41 is fixedly mounted on shaft 31 and is arranged to engage gear 40. Gears 40 and 41 have the identical number of teeth so that one complete revolution of shaft 31 and mirror 26 causes one complete revolution of shaft 30 and mirror 25. Motor 45 and clutch 46 are arranged to rotate shaft 31 in the direction of arrow 47, and the meshing of gears 40 and 41 causes the simultaneous rotation of shaft 30 in the direction of arrow 48.

Mirror 25 is mounted on shaft 30 such that its reflective faces are displaced angularly approximately 45 degrees from the reflective faces of mirror 26. Thus, as the portion of the line of light from lamp 20 penerating beam splitter 22 is reflected by mirror 25 onto glass sheet 10, thereby creating vertical line of light 50, mirror 26 directs the portion of light reflected by beam splitter 22 away from surface 10. As motor 45 and clutch 46 rotate shaft 31 and mirror 26 in the direction of arrow 47, gears 40 and 41 rotate shaft 30 and mirror 25 in the direction of arrow 48, thereby sweeping vertical line of light 50 from left to right across the screen 10. After line of light 50 is swept completely off screen 10 to the right, mirror 26 is in position 51 shown in phantom. At this time, the one-half of the light from lamp 20 reflected by beam splitter 22 is directed by mirror 26 onto screen 10 to produce line of light 52. As motor 45 and clutch 46 continue to rotate shaft 31 and mirror 26 in the direction of arrow 47, line of light 52 is swept vertically across screen 10 from bottom to top. As line of light 52 is swept over the top screen 10, a second face of mirror 25 begins to sweep a second line of light 50 from left to right across screen 10.

The alternate sweeping of lines of light 50 and 52 across screen 10 continues indefinitely with the rotation of shafts 30 and 31 by motor 45 and clutch 46.

A magnetic disk 60 is fixedly mounted on the end of shaft 30 and rotates synchronously therewith. The disk has a plurality of equidistant magnetic spots recorded thereon. An arm 61 is attached to the frame and has a magnetic transducer 62 fixedly mounted at the end thereof. Arm 61 is arranged so that magnetic transducer 62 detects each of the magnetically recorded spots on disk 60. In response to each one of the magnetic spots, magnetic transducer 62 produces an output pulse across wires 63 and 64. These pulses are applied to a binary counter 65 which accumulates a running total of the number of such pulses received.

Two photoconductors 70 and 71 are affixed adjacent screen 10. The photoconductors are connected in parallel across lines 72 and 73, which are connected to the reset terminals of counter 65. Thus, energization of either of the photoconductors causes counter 65 to be reset to zero. Photoconductor 70 is situated adjacent screen 10 so as to be illuminated by line of light 50 at the beginning of its sweep across the screen from left to right. In this manner, counter 65 is reset to zero at the beginning of the sweep of line of light 50, and the counter is sequentially incremented by the output of magnetic transducer 62 to indicate the instantaneous position of line of light 50 on screen 10. Likewise, photoconductor 71 is positioned at the bottom of screen 10 to reset counter 65 to zero as line of light 52 begins its sweep from bottom to top of screen 10.

A pointer 12 is manually positioned by the operator against the surface of glass sheet 10 at a selected point thereon to detect lines of light 50 and 52 as they are swept by the pointer.

Figure 2:
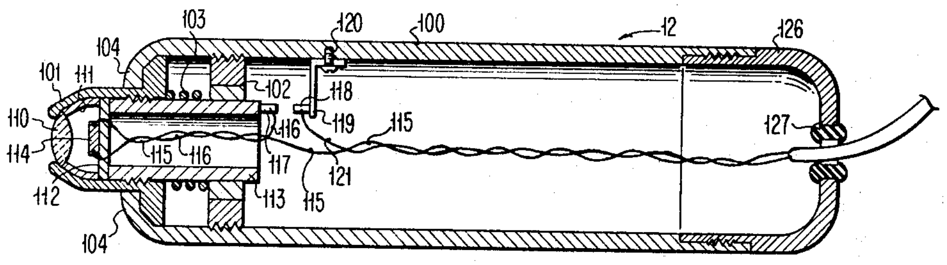
FIG. 2 is a sectional view of the pointer 12 of FIG. 1 taken along line A—A.

Pointer 12 is shown in greater detail in FIG. 2. The pointer includes a cylindrical outer shell 100 and a generally cylindrical nosepiece 101 slideably mounted within outer shell 100. A locking ring 102, which is threaded into shell 100 and spring 103, normally presses nosepiece 101 against ears 104 of the shell. Mounted internally of nosepiece 101 is a lens 110, a lens positioning piece 111, photoconductor positioning plate 112, and locking ring 113. Locking ring 113 is threaded into nosepiece 101 and presses plate 112 and positioning piece 111 against lens 110 to accurately position the lens so as to focus light onto photoconductor 114. Photoconductor 114 is fixedly mounted on plate 112, and opposite sides of the photoconductor are connected to wires 115 and 116. Wire 116 is connected to contact point 117 mounted on locking ring 113. A corresponding contact point 118 is mounted on a bracket 119 which is attached to shell 100 by means of screw 120. Contact point 118 is connected to wire 121, and wires 115 and 121 are connected to gate circuit 125 of FIG. 1. Gate circuit 125 is connected to counter 65 and, when actuated by a pulse at wires 115 and 121, gates out the then instantaneous setting of counter 65. A cap 126 is threaded into shell 100 having a circular hole therein where grommet 127 is placed which holds wires 115 and 121.

In operation referring to both FIGS 1 and 2, pointer 12 is held by the operator by means of shell 100. The operator then presses the pointer against screen 10 at a selected point thereon. Pressing the pointer against the screen causes nosepiece 101 to be moved within shell 100 against the force of spring 103. Locking ring 113 moves in conjunction with nose piece 101, thereby engaging contact points 117 and 118, completing the electrical connection between photoconductor 114 and gate circuit 125.

As the scanning mechanism begins to sweep line of light 50 across the surface of screen 10, photoconductor 70 resets counter 65 to zero. Magnetic transducer 62 then reads the magnetic spots recorded on magnetic disk 60 and provides pulses on lines 63 and 64, thereby continually incrementing counter 65. As line of light 50 reaches pointer 12, lens 110 focuses the light on photoconductor 114. Photoconductor 114 then conducts, actuating gate 125, thereby providing an output representative of the instantaneous setting of counter 65.

Then, as motor 45 continues to rotate shaft 31, line of light 52 illuminates photoconductor 71, thereby resetting counter 65 to zero. As the scanning apparatus sweeps line of light 52 from bottom to top of screen 10, magnetic disk 60 and transducer 62 continually increment counter 65. Upon line of light 52 reaching pointer 12, lens 110 focuses the light on photoconductor 114, again operating gate 125 and providing an output representative of the instantaneous count of counter 65.

Thus, the two outputs provided by gate 125 are the rectangular coordinates of the position of pointer 12 on the surface of screen 10.

The scanning apparatus will continue to provide the rectangular coordinates of the position of pointer 12 so long as the pointer is pressed against screen 10, engaging contact points 117 and 118. Upon the removal of pointer 12 from the surface of screen 10, contacts 117 and 118 are opened, and illumination of photoconductor 114 produces no output on lines 115 and 121.

Figure 3:
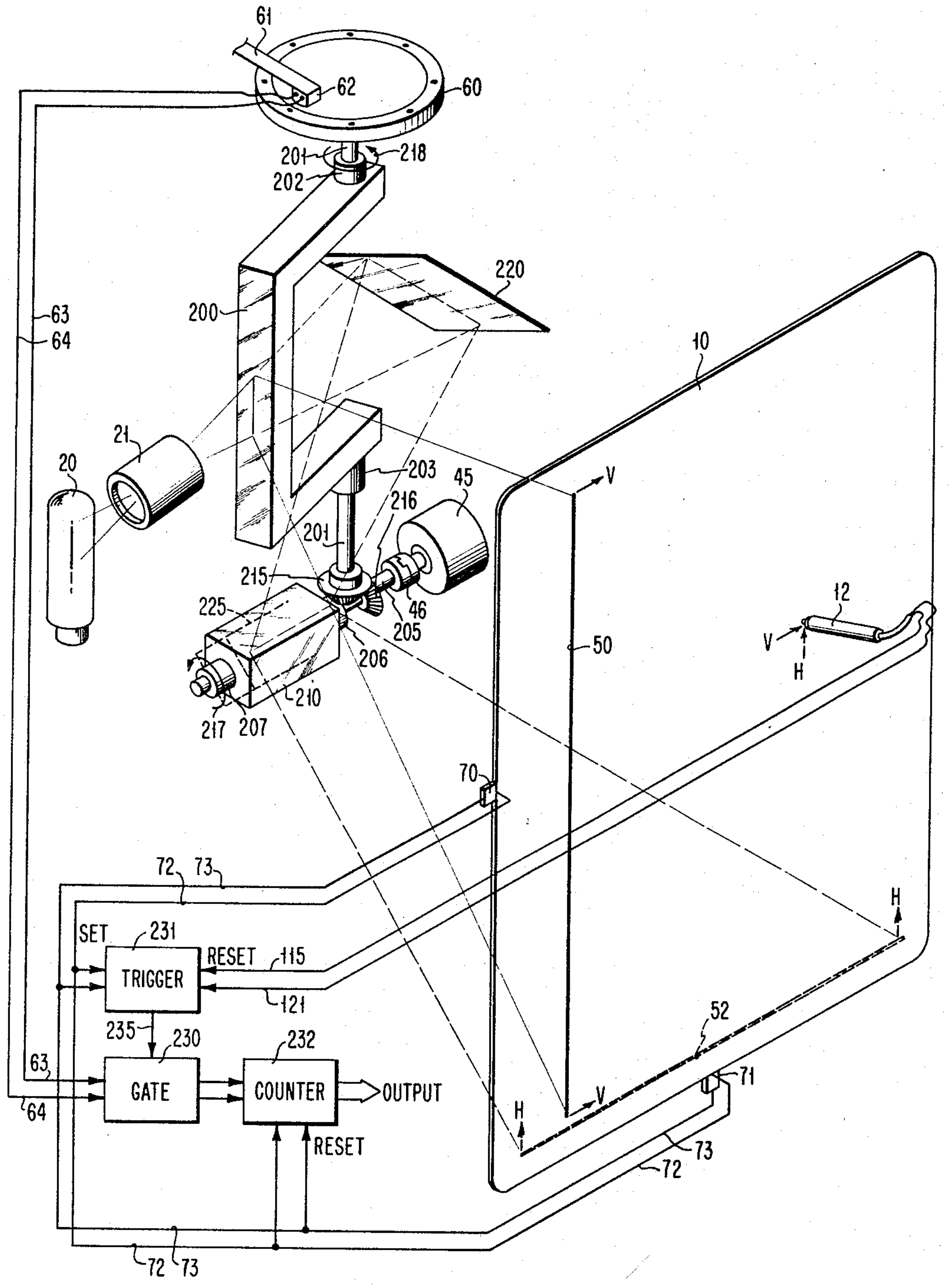
FIG. 3 is a perspective view, combined with a block electrical circuit diagram, illustrating an alternative preferred embodiment of the invention.

Referring to FIG. 3, an alternative embodiment of the present invention is illustrated. In this embodiment, the same screen 10 is scanned and the same pointer 12 is used by the operator to select a point thereon as shown in FIG. 1. Additionally, the scanning apparatus includes the same lamp 20 and focusing lens 21 as shown in FIG. 1. The scanning apparatus includes a mirror 200 which is mounted eccentrically on split shaft 201. Shaft 201 is mounted for rotation about its axis by bearings 202 and 203. These bearings are attached to a structural frame (not shown) so as to hold the axis of shaft 201 in vertical alignment and to prevent mirror 200 from moving up or down. A shaft 205 is similarly mounted for rotation in bearings 206 and 207. A mirror 210, having one mirrored surface, is mounted on shaft 205 such that its reflective surface is parallel to the axis of shaft 205. Bearings 206 and 207 are attached to the frame so as to maintain the axis of shaft 205 perpendicular to the axis of shaft 201 and to prevent mirror 210 from moving to either side.

A gear 215 is fixedly mounted at the bottom end of shaft 201, and a similar gear 216 is fixedly mounted on shaft 205 so as to engage gear 215. Gears 215 and 216 have the identical number of teeth so that one complete revolution of shaft 205 causes one complete revolution of shaft 201. Motor 45 and clutch 46 are arranged to rotate shaft 205 in the direction of arrow 217, and the meshing of gears 215 and 216 causes the simultaneous rotation of shaft 201 in the direction of arrow 218.

When mirror 200 is in the position shown, it intercepts the light from lamp 20 and lens 21 and reflects the light onto glass sheet 10, thereby creating vertical line of light 50. As motor 45 and clutch 46 rotate shaft 205 in the direction of arrow 217, gears 215 and 216 rotate shaft 201 in the direction of arrow 218, thereby sweeping vertical line of light 50 from left to right across the screen 10.

After line of light 50 is swept completely off screen 10 to the right, the eccentric action of mirror 200 has pulled the mirror out of the beam created by lamp 20 and lens 21. A 45-degree mirror 220 is attached to the frame and is positioned so as to reflect the light from lamp 20 onto mirror 210. At this time, mirror 210 is in the position 225 shown in phantom and reflects the light from mirror 220 onto screen 10 to produce line of light 52. As motor 45 and clutch 46 continue to rotate shaft 205 in the direction of arrow 217, line of light 52 is swept vertically across screen 10 from bottom to top. After line of light 52 is swept over the top of screen 10, motor 45 continues to rotate shaft 201 until mirror 200 again intercepts the beam of light from lamp 20 and lens 21. Thus, mirror 200 begins to sweep a second line of light 50 from left to right across screen 10.

Again, the alternate sweeping of lines of light 50 and 52 across screen 10 continues indefinitely with the rotation of shafts 201 and 205 by motor 45 and clutch 46.

A magnetic disk 60, having a plurality of equidistant magnetic spots recorded thereon, is fixedly mounted on the end of shaft 201 and rotates synchronously therewith. an arm 61 is attached to the frame and has a magnetic transducer 62 mounted at the end thereof, arranged to detect each of the magnetically recorded spots on disk 60. In response to each one of the magnetic spots, magnetic transducer 62 produces an output pulse across wires 63 and 64 which is applied to a gate circuit 230.

As in FIG. 1, two photoconductors 70 and 71 are affixed adjacent screen 10 so that photoconductor 70 is illuminated by line of light 50 at the beginning of its sweep across the screen, and photoconductor 71 is illuminated as line of light 52 begins its sweep from bottom to top of screen 10. The photoconductors are connected in parallel across lines 72 and 73, which are connected to the set terminals of a trigger 231 and to the reset terminals of a binary counter 232. Thus, upon either of the photoconductors being illuminated and conducting, trigger 231 is set and counter 232 is reset to zero. Upon being set, trigger 231 provides a continuous signal on line 235, thereby actuating gate 230 and allowing pulses across lines 63 and 64 to be applied to counter 232. Counter 232 accumulates a running total of the number of such pulses received. Upon counter 232 being reset to zero, it provides an output representative of the then accumulated total count reached.

As discussed with respect to FIG. 2, pointer 12, upon being positioned by the operator against the surface of glass sheet 10, detects lines of light 50 and 52 as they are swept by the pointer and provides an output pulse across lines 121 and 115 in response to such detection. Lines 121 and 115 are connected to the reset terminal of trigger 231. Thus, a pulse from pointer 12 resets trigger 231, thereby turning off gate 230 and blocking the further application of pulses from lines 63 and 64 to counter 232.

Referring still to FIG. 3, in operation, the operator presses the pointer 12 against screen 10 at a selected point thereon, thereby completing the electrical connection between photoconductor 114 of FIG. 2 and the reset terminal of trigger 231.

As the scanning mechanism begins to sweep line of light 50 across the surface of screen 10, photoconductor 70 conducts, thereby resetting counter 232 to zero and setting trigger 231. Trigger 231 supplies a continuous output signal on line 235 to gate circuit 230, which allows pulses from transducer 62 to be applied to counter 232. As motor 45 and clutch 46 rotate shaft 201, magnetic transducer 62 reads the magnetic spots recorded on magnetic disk 60, providing pulses on lines 63 and 64 which continually increment counter 232. As line of light 50 reaches pointer 12, photoconductor 114 in FIG. 2 of pointer 12 conducts, thereby resetting trigger 231 and blocking the further application of pulses from transducer 62 to counter 232. Thus, the number reached by counter 232 is representative of the horizontal rectangular coordinate of the position of pointer 12. As motor 45 continues to rotate shaft 201, line of light 52 illuminates photoconductor 71. Photoconductor 71 conducts, again setting trigger 231 and resetting counter 232. Upon being reset, counter 232 provides as an output the number reached before gate 230 was blocked, and the counter is then reset to zero.

Upon trigger 231 being set, gate circuit 230 is again actuated and allows magnetic disk 60 and transducer 62 to again continually increment counter 232. As line of light 52 reaches pointer 12, the pointer again resets trigger 231, blocking the application of further pulses to the counter. Upon line of light 50 again illuminating photoconductor 70, counter 232 is again reset providing an output signal indicative of the highest count reached, which number is the vertical rectangular coordinate of the position of pointer 12.

As in the first embodiment disclosed, the scanning apparatus of FIG. 3 will continue to provide the rectangular coordinates of the position of pointer 12 so long as the pointer is pressed against screen 10.

Any or all of the mirrors 26 and 26 of FIG. 1 or the mirrors 200, 210 and 220 of FIG. 3 may be replaced by any other suitable deflection means such as prisms, without departing from the scope of our invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for scanning a surface and indicating the position of a selected point on the surface, comprising:
   - means for generating an essentially planar light beam;
   - a beam splitter for the light beam from said generating means;
   - a pair of deflectors, one for each beam from said splitter and positioned to direct each beam toward the surface;
   - means for moving said deflectors so that the beams from said splitter move across the surface in perpendicular directions;
   - position-indicating means for indicating the positions of the beams from said splitter along the directions of motion effected by said moving means;
   - light sensing means positionable at any point on the surface, to provide an output whenever illuminated by either of the beams from said splitter; and
   - gate means responsive to the output of said sensing means for providing an output representative of the indication of said position-indicating means at the time of receipt of the output from said sensing means.

2. The apparatus of claim 1 wherein said moving means moves said deflectors so that the beams from said splitter illuminate the surface alternately.

3. The apparatus of claim 2 wherein said moving means provides rotational movement for said deflectors.

4. The apparatus of claim 3 wherein said position-indicating means comprises:

a pair of light sensing devices positioned at the edges of the surface and responsive one to each beam from said splitter to generate an output; and a counter synchronized with said moving means for generating counts corresponding to discrete positions of the beams from said splitter and responsive to the outputs from said sensing devices to start its count.

5. The apparatus of claim 4 and means to control said gate means to provide the output from said position-indicating means as of the time of receipt of the output from said sensing means corresponding to each beam from said splitter until the respective beam reaches its limit of motion as imparted by its said deflector.

6. Apparatus for scanning a surface with two mutually perpendicular lines of light and indicating the position of a selected point on the surface, comprising:

means for producing an essentially planar beam of light;

means for deflecting, during a selected period of time, said beam of light onto said surface, producing at the intersection therebetween a first line of light extending across said surface in a first dimension, and for sweeping, during said selected time period, said first line of light across said surface in a direction perpendicular to said first dimension;

a second deflection means for deflecting, during a second time period different than said first time period said beam of light onto said surface, producing at the intersection therebetween a second line of light extending across said surface in a second dimension perpendicular to said first dimension and for sweeping, during said second time period, said second line of light across said surface in a direction perpendicular to said second dimension;

position-indicating means for indicating the instantaneous position of said first line of light along its direction of motion and for indicating the instantaneous position of said second line of light along its direction of motion;

a light-responsive means positionable at any selected point on said surface, said sensing means providing an output whenever illuminated by either of said beams of light; and means responsive to said output of said sensing means for detecting the instantaneous indication of said position-indicating means and for providing electrical signals representative of said detected indication.

References Cited

UNITED STATES PATENTS

| | | | |
|---|---|---|---|
| 1,790,491 | 1/1931 | Smith | 178—7.6 |
| 2,903,690 | 9/1959 | Slack | 250—217 |
| 3,181,154 | 4/1965 | Henne | 250—217 |

JOHN W. CALDWELL, *Acting Primary Examiner.*

J. A. ORSINO, *Assistant Examiner.*